(12) United States Patent
Nishikawa et al.

(10) Patent No.: US 10,193,399 B2
(45) Date of Patent: Jan. 29, 2019

(54) POWER SUPPLY DEVICE

(71) Applicant: FUNAI ELECTRIC CO., LTD., Osaka (JP)

(72) Inventors: Takafumi Nishikawa, Osaka (JP); Yoshitaka Fujimoto, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 118 days.

(21) Appl. No.: 15/297,144

(22) Filed: Oct. 19, 2016

(65) Prior Publication Data

US 2017/0110884 A1     Apr. 20, 2017

(30) Foreign Application Priority Data

Oct. 19, 2015  (JP) ................. 2015-205320
Sep. 8, 2016   (JP) ................. 2016-175888

(51) Int. Cl.
| | |
|---|---|
| *H02J 50/80* | (2016.01) |
| *H02J 50/12* | (2016.01) |
| *H02J 13/00* | (2006.01) |
| *H04B 5/00* | (2006.01) |
| *H04W 52/02* | (2009.01) |
| *H02J 50/40* | (2016.01) |
| *H02J 7/02* | (2016.01) |

(52) U.S. Cl.
CPC .............. *H02J 50/80* (2016.02); *H02J 7/025* (2013.01); *H02J 13/00* (2013.01); *H02J 50/12* (2016.02); *H02J 50/40* (2016.02); *H04B 5/0037* (2013.01); *H04W 52/0261* (2013.01); *Y02D 70/00* (2018.01); *Y02D 70/144* (2018.01); *Y02D 70/42* (2018.01)

(58) Field of Classification Search
CPC .. H02J 50/40; H02J 50/80; H02J 5/005; H02J 7/025; H04B 5/0037; H04W 52/0261; H04L 12/10
See application file for complete search history.

(56) References Cited

U.S. PATENT DOCUMENTS

| | | |
|---|---|---|
| 8,860,364 B2 | 10/2014 | Low et al. |
| 2012/0200158 A1 | 8/2012 | Takei |

(Continued)

FOREIGN PATENT DOCUMENTS

| | | |
|---|---|---|
| CN | 102577024 | 7/2012 |
| JP | 2014-054182 | 3/2014 |

*Primary Examiner* — Ryan Johnson
(74) *Attorney, Agent, or Firm* — JCIPRNET

(57) ABSTRACT

The invention provides a power supply device, which is capable of properly supplying the power even if the power is supplied to the power receiving devices having a number exceeding the number that the communication part is capable of simultaneously communicating with. The power supplying device includes: a power supply part, capable of supplying a power to a plurality of external devices; a communication part, capable of communicating with the external devices; and a controller, disconnecting one or more of the external devices based on a power supplied information of the external devices being in a predetermined range in a case that a number of requests for a communication from the external devices exceeds a number that the communication part is capable of communicating with at the same time.

17 Claims, 8 Drawing Sheets

(56) References Cited

U.S. PATENT DOCUMENTS

| | | | |
|---|---|---|---|
| 2014/0008990 A1* | 1/2014 | Yoon | H02J 5/005 307/104 |
| 2014/0285143 A1* | 9/2014 | Kwon | H02J 7/007 320/108 |
| 2015/0054353 A1 | 2/2015 | Low et al. | |
| 2017/0047788 A1* | 2/2017 | Xu | H02J 50/40 |
| 2018/0069430 A1* | 3/2018 | Van Wageningen | H02J 50/10 |

* cited by examiner

POWER SUPPLY DEVICE

CROSS-REFERENCE TO RELATED APPLICATION

This application claims the priority benefits of Japanese patent application no. 2015-205320, filed on Oct. 19, 2015 and Japanese patent application no. 2016-175888, filed on Sep. 8, 2016. The entirety of each of the above-mentioned patent applications is hereby incorporated by reference herein and made a part of this specification.

BACKGROUND OF THE INVENTION

1. Field of the Invention

The invention relates to a power supply device, and more particularly, relates to a power supply device having a communication part and a power supply method thereof.

2. Description of Related Art

In the conventional art, a power supply device having a communication part and a power supply method has been proposed (e.g., referring to Patent Document 1).

In Patent Document 1, a wireless power device having communication channels is disclosed. Said wireless power device is disposed with the communication channels and a transmitting coil, and configured to supply a power from the transmitting coil to receiving coils of a plurality of receivers. Further, the communication channels are capable of wirelessly communicating with the receivers, respectively. Also, the communication channels are configured to transmit a signal for requesting correction of load resistance to the receivers. Further, the receivers are configured to correct the load resistances based on the signal requesting correction of the load resistance. As a result, the wireless power device is configured to control a power distribution for each of the receivers by making the receivers correct the load resistances in addition to supplying the power from the transmitting coil to the receiving coils of the receivers.

PRIOR ART DOCUMENT

Patent Document

Patent Document 1: Japanese Patent Publication No. 2014-54182

SUMMARY OF THE INVENTION

In general, there is an upper limit for the number of the communication channels in terms of standard or specification. That is to say, the upper limit refers to a quantity (a number of units) that the communication channels are capable of simultaneously communicating with. For example, in Bluetooth™ standard, the upper limit is eight units at the most, but the upper limit may sometimes be less than eight units (e.g., 3 units) based on the specification. Therefore, when the power is supplied to the receivers having a number exceeding the number of the communication channels in the wireless power device according to Patent Document 1, it is considered that the power may be supplied to the extra receiver before the signal requesting for correction of load resistance can arrive.

In this case, if the receiver not receiving the signal requesting for correction of load resistance has a smaller load resistance, it is considered that a receiving voltage value may become larger in correspondence to the smaller load resistance. On the other hand, if the receiver not receiving the signal requesting for correction of load resistance has a larger load resistance, it is considered that the receiving voltage value may become smaller in correspondence to the larger load resistance. As a result, it is considered that the receiving voltage value may sometimes become a value that falls outside a range acceptable by the receiver. Accordingly, the wireless power device in Patent Document 1 may have a problem in which the wireless power device is unable to properly supply the power when the number of the receivers (power receiving devices) exceeds the number of units that the communication channels (communication part) are capable of simultaneously communicating with.

The invention is proposed to solve the above problem. The invention aims to provide a power supply device, which is capable of properly supplying the power even if the power is supplied to the power receiving devices (external device) having a number exceeding the number that the communication part is capable of simultaneously communicating with.

A power supply device according to a first aspect of the invention includes: a power supply part, capable of supplying a power to a plurality of external devices; a communication part, capable of communicating with the external devices; and a controller, disconnecting one or more of the external devices based on a power supplied information of the external devices being in a predetermined range in a case that a number of requests for a communication from the external devices exceeds a number that the communication part is capable of communicating with at the same time. The power supply device can also have a power source for providing the power.

The controller determines a disconnection based on a comparison of the power supplied information and predicted values of the power supplied information of the external devices.

The power supplied information comprises a plurality of plotted results, and the controller decides to disconnect one or more of the external devices when a fixed ratio or more of the plotted results fall within a fixed range of the predicted values of the power supplied information.

In the power supply device according to the first aspect of the invention, the variation of the power supplied information in the elapsed time becomes predictable after the controller compares the power supplied information and the predicted values of the power supplied information. Therefore, because of the predictable variation, one or more of the external devices not requiring the communication may be disconnected so the external devices requiring the communication may be preferentially connected. Also, by predicting the variation of the power supplied information in the elapsed time, the power may still be properly supplied even if the power is supplied to the external devices having a number exceeding the number that the communication part is capable of communicating with.

Preferably, in the power supply device according to the first aspect of the invention, when a number of requests for the communication from the external devices exceeds a number that the communication part is capable of communicating with, one or more of the external devices will be decided to be disconnected by the controller. With such configuration, the number of the external devices that the communication part communicates with may be prevented from exceeding the predetermined number of the external devices that the communication part is capable of communicating with.

Preferably, in the power supply device according to the first aspect of the invention, the communication part obtains power reception information from the external devices being communicated with. The power supplied information includes the power reception information of the external devices. With such configuration, the variation of the power reception information of the external devices becomes predictable in the elapsed time. Therefore, by disconnecting one or more of the predictable external devices, the number of the external devices that the communication part communicating with may be prevented from exceeding the predetermined number of the external devices that the communication part is capable of communicating with, and the power may be properly supplied to all of the external devices. Further, since the disconnection of the external devices is directly determined by checking the power reception information of the external devices, the power may be supplied more safely.

Preferably, the variation of the power reception information of the external devices in the elapsed time herein includes a variation of a received power of the external devices in the elapsed time. The predicted values of the power reception information of the external devices in the elapsed time include a variation pattern of a requested power of the external devices in the elapsed time. With such configuration, the variation of the received power of the external devices becomes predictable in the elapsed time. Therefore, by disconnecting one or more of the predictable external devices, the number of the external devices that the communication part communicates with may be prevented from front exceeding the predetermined number of the external devices that the communication part is capable of communicating with, and the power may be properly supplied to all of the external devices. Further, since the disconnection of the external devices is directly determined by checking the received power of the external devices, the power may be supplied more safely.

Preferably, the predicted values includes a variation pattern continuously increased for a fixed time and subsequently decreased for another fixed time. With such configuration, whether one or more of the external devices includes a battery that can be stably charged for more than a fixed time through a cccv (constant current constant voltage) control may be determined. Also, the received power of the external devices becomes predictable in the elapsed time. Therefore, the power may still be properly supplied even if one or more of the predictable external devices are disconnected.

Preferably, the predicted values includes a variation pattern of the requested power showing no variation for more than a fixed time. With such configuration, whether the external devices are the devices not having the battery may be determined. Also, the received power of the external devices is predictable to have no variation in the elapsed time. Therefore, the power may still be stably supplied even if one or more of the predictable external devices are disconnected.

Preferably, the predicted values includes a variation pattern of the requested power continuously decreased for more than a fixed time. With such configuration, the received power of the external devices becomes predictable in the elapsed time. Therefore, the power may still be properly supplied even if one or more of the predictable external devices are disconnected. Further, it may be determined that the power supply is no longer required after the requested power becomes zero so the power supply may be prevented from wasting.

Preferably, the power reception information includes a remaining capacity of a secondary battery of the external devices. A predicted values of the remaining capacity of the secondary battery of the external devices in the elapsed time include a variation pattern of the remaining capacity of the secondary battery saturated after a fixed time. With such configuration, the variation of the remaining capacity of the secondary battery of the external devices becomes predictable in the elapsed time. Therefore, the power may still be properly supplied even if one or more of the predictable external devices are disconnected. Further, since the disconnection of the external devices is directly determined by checking the remaining capacity of the secondary battery of the external devices, the power may be supplied more accurately. Further, it may be determined that the power supply is no longer required after the remaining capacity of the secondary battery is saturated so the power supply may be prevented from wasting.

Preferably, in the power supply device according to the first aspect, the power supplied information includes output information of the power source. With such configuration, the variation of the output information of the power source becomes predictable in the elapsed time. Therefore, by disconnecting one or more of the predictable external devices, the number of the external devices that the communication part communicates with may be prevented from exceeding the predetermined number of the external devices that the communication part is capable of communicating with, and the power may be properly supplied to all of the external devices. Further, since the disconnection of the external devices is directly determined by checking the output information of the power source, it is not required to obtain the power reception information of the power source so the overall operation may be simplified.

Preferably, the output information of the power source herein includes an output power of the power source. With such configuration, the variation of the output power of the power source becomes predictable in the elapsed time. Therefore, by disconnecting one or more of the predictable external devices, the number of the external devices that the communication part communicates with may be prevented from exceeding the predetermined number of the external devices that the communication part is capable of communicating with, and the power may be properly supplied. Further, since the disconnection of one or more of the external devices is directly determined by checking the output power of the power source, it is not required to obtain information such as the received power of the power source so the overall operation may be simplified. In addition, since the determination is made according to the power in the power supply device, the power may be determined more accurately without suffering external influences during the communication.

In the power supply device, the predicted values includes a variation pattern of the output power continuously increased for a fixed time and subsequently decreased for another fixed time. With such configuration, whether one or more of the external devices are the devices having the battery that can be stably charged for more than the fixed time through the cccv control may be determined. Also, the variation of the output power of the power source becomes predictable in the elapsed time. Therefore, the power may still be properly supplied even if one or more of the predictable external devices are disconnected.

According to the invention, as described above, the power may still be properly supplied even if the power is supplied to the external devices having a number exceeding the number that the communication part is capable of communicating with.

The controller may disconnect one or more of the external devices having a largest difference between a minimum operating voltage and a received voltage of the external devices.

The controller may disconnect one or more of the external devices whose requested power first reached within a fixed value among the external devices.

The controller may disconnect one or more of the external devices having a longer power-supply elapsed time among the external devices.

The controller may disconnect one or more of the external devices corresponding to the predicted values showing no variation for more than a fixed time among the external devices.

The controller may disconnect one or more of the external devices having a smallest difference between a maximum capacity and a current capacity of the secondary battery of the external devices.

The controller may disconnect one or more of the external devices approaching a fully-charged state according to a charging condition of a secondary battery of the external devices.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
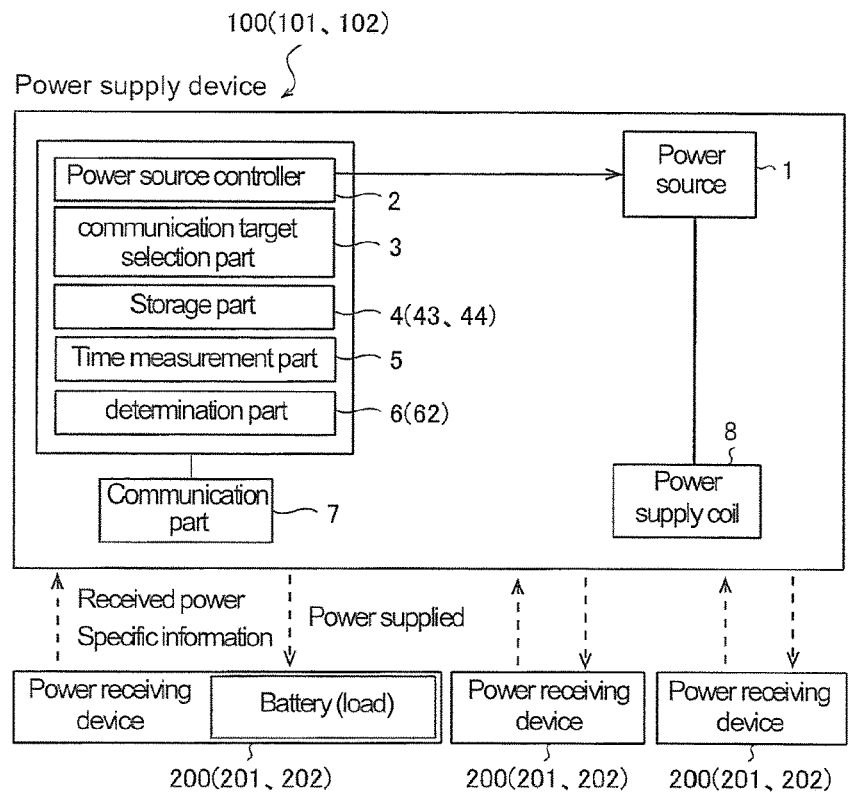
FIG. 1 is a block diagram illustrating overall configuration of the power supply device in the first embodiment, the fourth embodiment and the fifth embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The embodiments of the invention are described below with reference to the accompanying drawings.

First Embodiment

Figure 2:
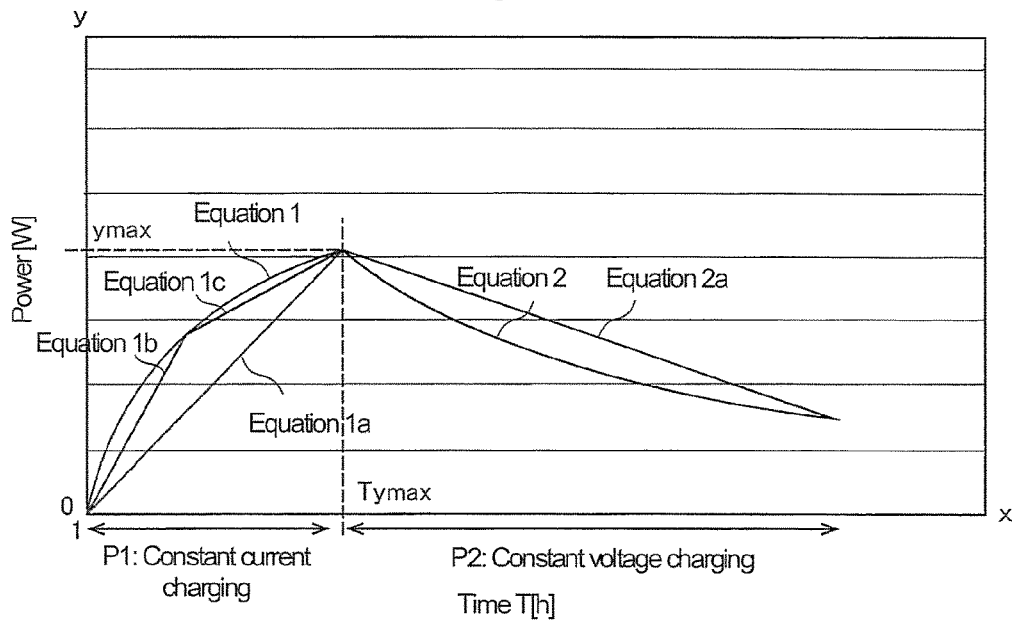
FIG. 2 is a graph illustrating variation patterns of the requested power of the power receiving device (external device) and the output power of the power supply device over time in the first embodiment and the second embodiment of the invention.
Figure 3:
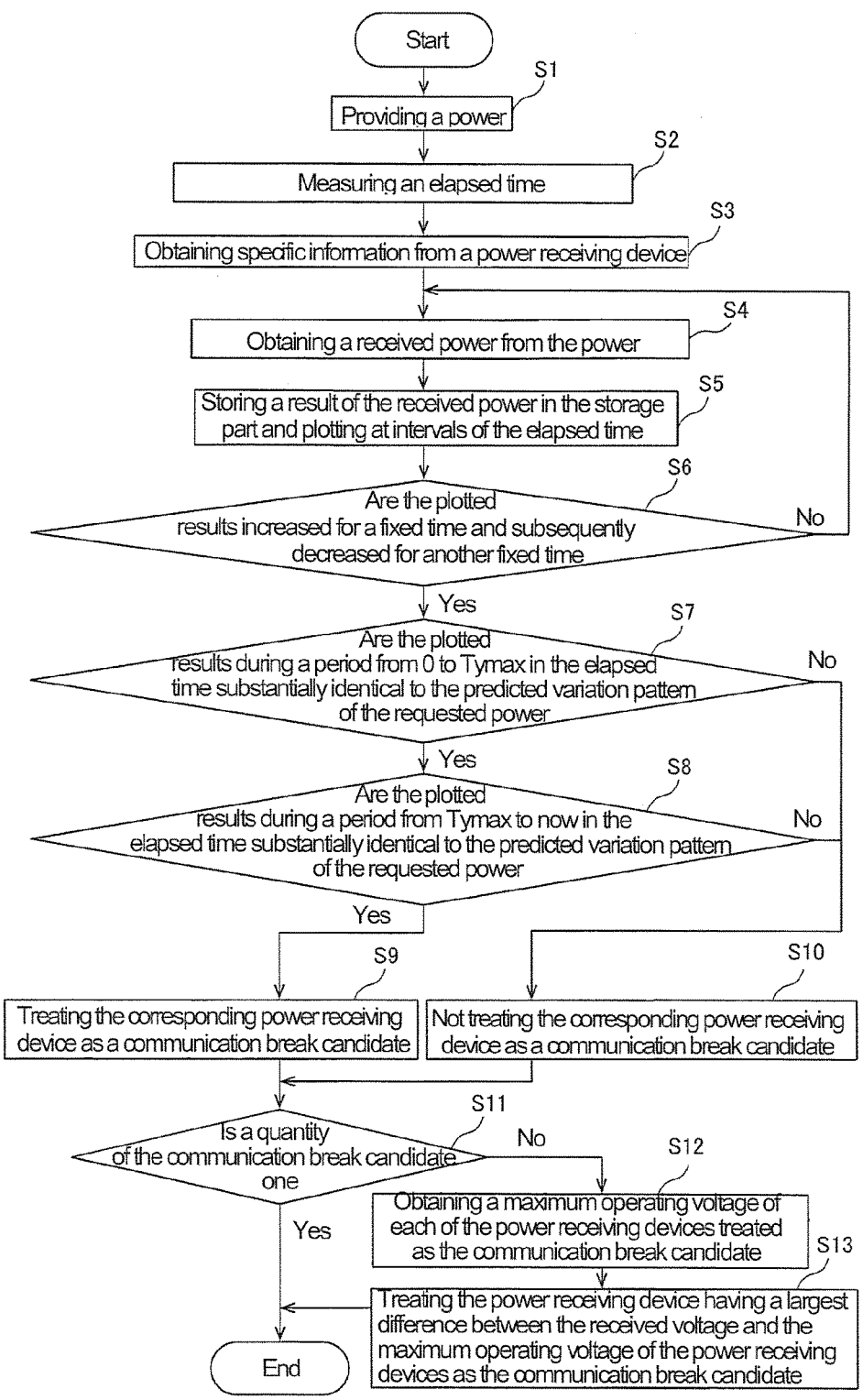
FIG. 3 is a flowchart illustrating a process in a selection of the power receiving device for breaking the communication according to the first embodiment of the invention.

Referring to FIG. 1 to FIG. 3, the configuration of a power supply device 100 according to the first embodiment of the invention is described as follows. As shown in FIG. 1, the power supply device 100 of the first embodiment simultaneously supplies a power to a plurality of power receiving devices 200 (e.g., smart phones) disposed near the power supply device 100 in a magnetic resonance manner (used as a non-contact power supply device or a non-contact point power supply device) without disposing any wires or contact points between the power supply device 100 and the power receiving devices 200.

(Overall Configuration of the Power Supply Device)

As shown in FIG. 1, the power supply device 100 includes a power source 1, a power source controller 2, a communication target selection part 3, a storage part 4, a time measurement part 5, a determination part (controller) 6, a communication part 7 and a power supply coil 8.

(Configuration of Each Part of the Power Supply Device)

The power supply coil 8 supplies a power provided from the power source 1 to the power receiving devices 200. The communication part 7 is capable of communicating with a predetermined number of the power receiving devices 200. Further, the communication part 7 obtains specific information (e.g., addresses) of the power receiving devices 200 and a received power of the power receiving device 200 selected by the communication target selection part 3. The time measurement part 5 measures an elapsed time counted from the time when starting to supply the power. The storage part 4 stores a measured variation pattern of the received power from the selected power receiving device 200 in the elapsed time and a predicted variation pattern of a request power of the power receiving device 200 in the elapsed time in advance. The determination part 6 determines whether the measured variation pattern of the received power in the elapsed time is substantially identical to the predicted variation pattern of the request power in the elapsed time. The power receiving device 200 corresponding to the measured variation pattern determined as being approximate to the predicted variation pattern is also treated as being approximate. In addition, definition of the so-call communication mentioned in the present application refers to a configuration capable of receiving and transmitting information related to the received power at the same time.

In the storage part 4, a plurality of predicted variation patterns such as 10 or more predicted variation patterns of a requested power in the elapsed time are stored in advance. For example, equations (1), (1a), (1b) and (1c) shown in FIG. 2 are stored in the storage part 4 as an expression for representing a variation pattern of the power continuously increased for a fixed time (e.g., 1 hour) by a constant current charging. Further, equations (2) and (2a) are stored in the storage part 4 as an expression for representing a variation pattern of the power decreased for a fixed time (e.g., 0.5 hour) by a constant voltage charging. Furthermore, in FIG. 2, a time-point where the constant current charging is switched to the constant voltage charging is set as Tymax, and the requested power at the time is set as ymax. Moreover, a, b, c, d, e, f, g, h, and i are set as arbitrary constant (e.g., 1).

$$y = a \times \log_b x \quad (1)$$

$$y = a \times x \quad (1a)$$

$$y = c \times x \quad (1b)$$

$$y = d \times x + e \quad (1c)$$

$$y = \frac{f}{x^g} \quad (2)$$

$$y = -h \times x + i \quad (2a)$$

Here, in the first embodiment, when a number of requests for the communication from the power receiving devices 200 exceeds a number that the communication part 7 is capable of simultaneously communicating with, the power receiving device 200 determined as being approximate by the determination part 6 is preferentially disconnected. Specifically, first of all, the variation of the received power of the selected power receiving device 200 in the elapsed time is plotted at intervals of the fixed time to obtain a measured variation pattern (plotted results) of the power receiving device. Here, to ensure the correctness, the number of the plotted results is preferred to be as many as possible. For example, 100 measured values are plotted for the received power of the power receiving device 200 in the elapsed time. Here, 100 is merely an example, and persons skilled in the art may increase or decrease the number of the plotted results based on demands.

As an example, the obtained variation pattern (the measured variation pattern) is considered as being approximate to the variation pattern (a predicted variation pattern) stored in advance by the power supplying device 100 when the following conditions are met. First, the amount of information obtaining from the predicted variation pattern and the number of the plotted results should be more than a fixed number, for example, the number of the plotted results is more than 100 (or even more than that). Then, the measured values of the plotted results should fall within a fixed range of predicted values of the predicted variation pattern (e.g., within +5%). Generally, as an example, absolute values of the measured values may be used. Furthermore, if the measured variation pattern is determined as substantially identical to the predicted variation pattern and a fixed ratio or more of the plotted results are substantially identical to the predicted variation pattern e.g., more than 90%, the measured variation pattern is determined as being approximate to the predicted variation pattern. The power receiving device 200 corresponding to the measured variation pattern determined as being approximate to the predicted pattern is also treated as being approximate.

If the power supplying device 100 is received a request for the communication from a new power receiving device 200 when the power supplying device 100 is communicating with the power receiving devices 200 in an allowable number (e.g., three), the power supplying device 100 disconnects the power receiving device 200 determined as being approximate among the three by the determination part 6 and preferentially connect the new power receiving device 200. One of the rules for determining whether to preferentially break the communication or not is based on a reducing speed of the requested power of the power receiving device 200. For instance, among three communication break candidates, as shown by the equation (2) of the first embodiment in FIG. 2, when the requested power [W] is reduced in relative to time variation, the power receiving device having the requested power [W] first reached within a fixed value on a time T may be preferentially disconnected. Here, as an example, the fixed value may be 1 W or 0 W. Said fixed value may also be appropriately adjusted according to characteristic or actual charging requirement of the power receiving device 200.

(Selection of the Power Receiving Device for Breaking the Communication)

Next, referring to FIG. 3, a selection of the power receiving device 200 for breaking the communication made by the power supply device 100 of the first embodiment is described as follows.

First of all, in step S1, a power is provided to the power supply coil 8 (referring to FIG. 1).

In step S2, an elapsed time counted from the time when starting to supply the power is measured.

In step S3, specific information (e.g., addresses) is obtained from the power receiving device 200.

In step S4, a received power is obtained from the power receiving device 200.

In step S5, a result of the received power obtained in step S4 are stored in the storage part 4 and plotted at intervals of the elapsed time.

In step S6, whether the plotted results obtained in step S5 are increased for a fixed time and subsequently decreased for another fixed time is determined. If yes, the process proceeds to step S7, and otherwise returns to step S4.

In step S7, whether the plotted results (measured variation pattern) starting from 0 to Tymax in the elapsed time are substantially identical to the predicted variation pattern of the requested power stored in the storage part 4 is determined. If the result is substantially identical, the process proceeds to step S8, and otherwise proceeds to step S10.

In step S8, whether the plotted results after the time point Tymax in the elapsed time is substantially identical to the predicted variation pattern of the requested power stored in the storage part 4 is determined. If the result is substantially identical, the process proceeds to step S9, and otherwise proceeds to step S10.

In step S9, the corresponding power receiving device 200 is treated as a communication break candidate.

In step S10, the corresponding power receiving device 200 is not treated as the communication break candidate.

In step S11, whether a quantity of the communication break candidate is one is determined. If the quantity of the communication break candidate is two or more, the process proceeds to step S12.

In step S12, a maximum operating voltage of each of the power receiving devices 200 treated as the communication break candidate is obtained.

In step S13, in order to prevent a breakdown of the power receiving device 200 caused by the received voltage being greater than the maximum operating voltage, the power receiving device 200 having a largest difference between the maximum operating voltage of each of the power receiving devices 200 obtained in step S12 and the received voltage of the power receiving devices 200 is treated as the communication break candidate.

In a modification example of step S12 to S13, in order to prevent an unchargeable issue of the power receiving device 200 caused by the received voltage being less than a minimum operating voltage, the minimum operating voltage of each of the power receiving devices 200 being the communication break candidate is obtained and the power receiving devices 200 having a largest difference between the minimum operating voltage and the received voltage of the power receiving device 200 is treated as a communication break candidate.

Other than preventing the breakdown of the power receiving device by selecting the communication break candidate mentioned above, other protection measures may also be taken for the power receiving device 200 that could be suddenly disconnected. For instance, some of the power receiving devices 200 may include a built-in protection function (a power management circuit (PMU, etc.), which is capable of protecting the power receiving device 200 from receiving power more than a maximum operating voltage and/or over voltage during a charging process or when the charging process is started or the charging process is terminated. The power management circuit of these power receiving devices (e.g., a cell phone or other general electronics) may receive external commands to activate the protection function. For the power receiving devices having the protection function and capable of activating the protection function by utilizing the external commands, when the power supplying device 100 considers these power receiving devices 200 as the communication break candidate and intends to disconnect these power receiving devices, the external commands may be sent to the power receiving devices 200 before disconnection to activate their protection functions.

The protection function of the power receiving device 200 is to, for example, utilize a switch structure to alternatively switch between short circuit and open circuit of a power receiving part (a power receiving coil) and the control part physically, so as to protect the power receiving device 200 from the breakdown. Further, a resonance circuit structure capable of adjusting component constants (capacitance or inductance constants), such as a variable capacitor formed by connecting multiple capacitors together to be alternatively switched, may also be used. By adjusting the component constants, a resonance frequency of the power receiving device may be adjusted to adjust the charging function, so as to accomplish the effectiveness of slowly detaching from the charging process.

Effects of First Embodiment

The following effects may be obtained according to the first embodiment.

In the first embodiment, as described above, the determination part 6 determines whether a measured variation pattern of power supplied information related to the power supply coil 8 in the elapsed time is approximate to a predicted variation pattern of the power supplied information related to the power supply coil 8 in the elapsed time. Accordingly, the variation of the power supplied information in the elapsed time becomes predictable after the determination part 6 determines the power supplied information related to the power supply coil 8 as being approximate to the predicted variation pattern. Therefore, because of the predictable variation, the power receiving device 200 not requiring the communication may be disconnected so the power receiving device 200 requiring the communication may be preferentially connected. Also, the power may still be properly supplied even if the power is supplied to the power receiving devices 200 having a number exceeding the number that the communication part 7 is capable of simultaneously connecting to.

Further, in the first embodiment, as described above, when the number of requests for the communication from the power receiving devices 200 exceeds a number that the communication part 7 is capable of simultaneously communicating with, the power receiving device 200 determined as being approximate by the determination part 6 is preferentially disconnected. Accordingly, because the power receiving device 200 determined as being approximate by the determination part 6 is preferentially disconnected, the number of the power receiving devices 200 that the communication part 7 communicates with may be prevented from exceeding the predetermined number that the communication part 7 is capable of communicating with.

Further, in the first embodiment, as described above, the determination part 6 determines whether the measured variation pattern of the received power (power reception information) of the power receiving device 200 in the elapsed time obtained by the communication part 7 is approximate to the predicted variation pattern of the requested power (power reception information) of the power receiving device 200 in the elapsed time, and preferentially disconnect the power receiving device 200 determined as being approximate. Accordingly, the power receiving device 200 becomes predictable once the measured variation pattern of the received power of the power receiving device 200 in the elapsed time is approximate to the predicted variation pattern of the requested power of the power receiving device 200 in the elapsed time. Therefore, by disconnecting the predictable power receiving device 200, the number of the power receiving devices 200 that the being communicated with the communication part 7 may be prevented from exceeding the predetermined number that the communication part 7 is capable of communicating with, and the power may be properly supplied to all of the power receiving devices 200. Further, since the power receiving device 200 treated as the communication break candidate is directly determined by checking the received power of the power receiving device 200, the power may be supplied more safely.

Furthermore, in the first embodiment, as described above, the determination part 6 can determine that the measured variation pattern is approximate to the predicted variation pattern when the measured variation pattern of the received power in the elapsed time is substantially identical to the predicted variation pattern of the requested power, which is continuously increased for the fixed time and subsequently decreased for the another fixed time. Accordingly, whether the power receiving device 200 includes a battery that can be stably charged for more than a fixed time through the cccv (constant current constant voltage) control may be determined. Also, if the measured variation pattern is determined to be approximate to the predicted variation pattern, the variation of the received power of the power receiving device 200 becomes predictable in the elapsed time. Therefore, the power may still be properly supplied even if the predictable power receiving device 200 is disconnected.

Second Embodiment

Next, referring to FIG. 2, FIG. 4 and FIG. 5, the configuration of a power supply device 300 according to the second embodiment of the invention is described as follows. In addition to the configuration described in the first embodiment, a power measurement part 9 for measuring an output power of the power source 1 is further installed in the second embodiment. Further, the components similar to those in the first embodiment are marked with the same reference numbers used in the first embodiment and related descriptions thereof are omitted hereinafter.

(Overall Configuration of the Power Supply Device)

Figure 4:
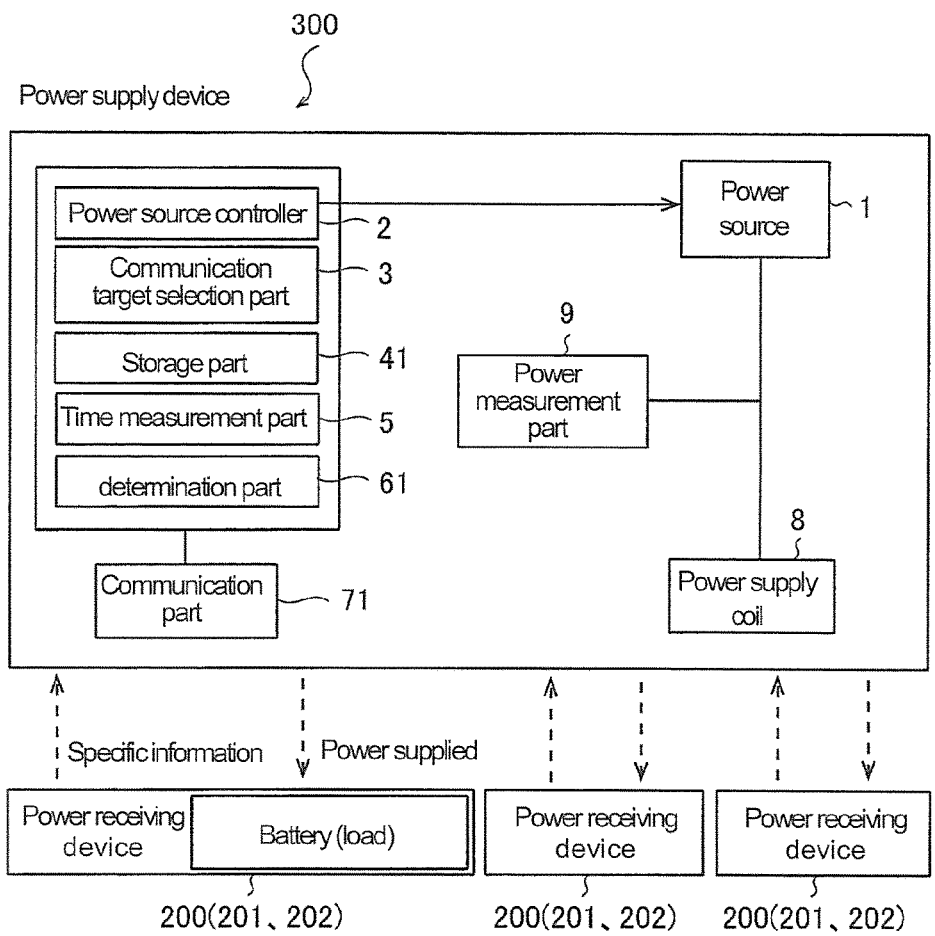
FIG. 4 is a block diagram illustrating overall configuration of the power supply device in the second embodiment of the invention.
Figure 5:
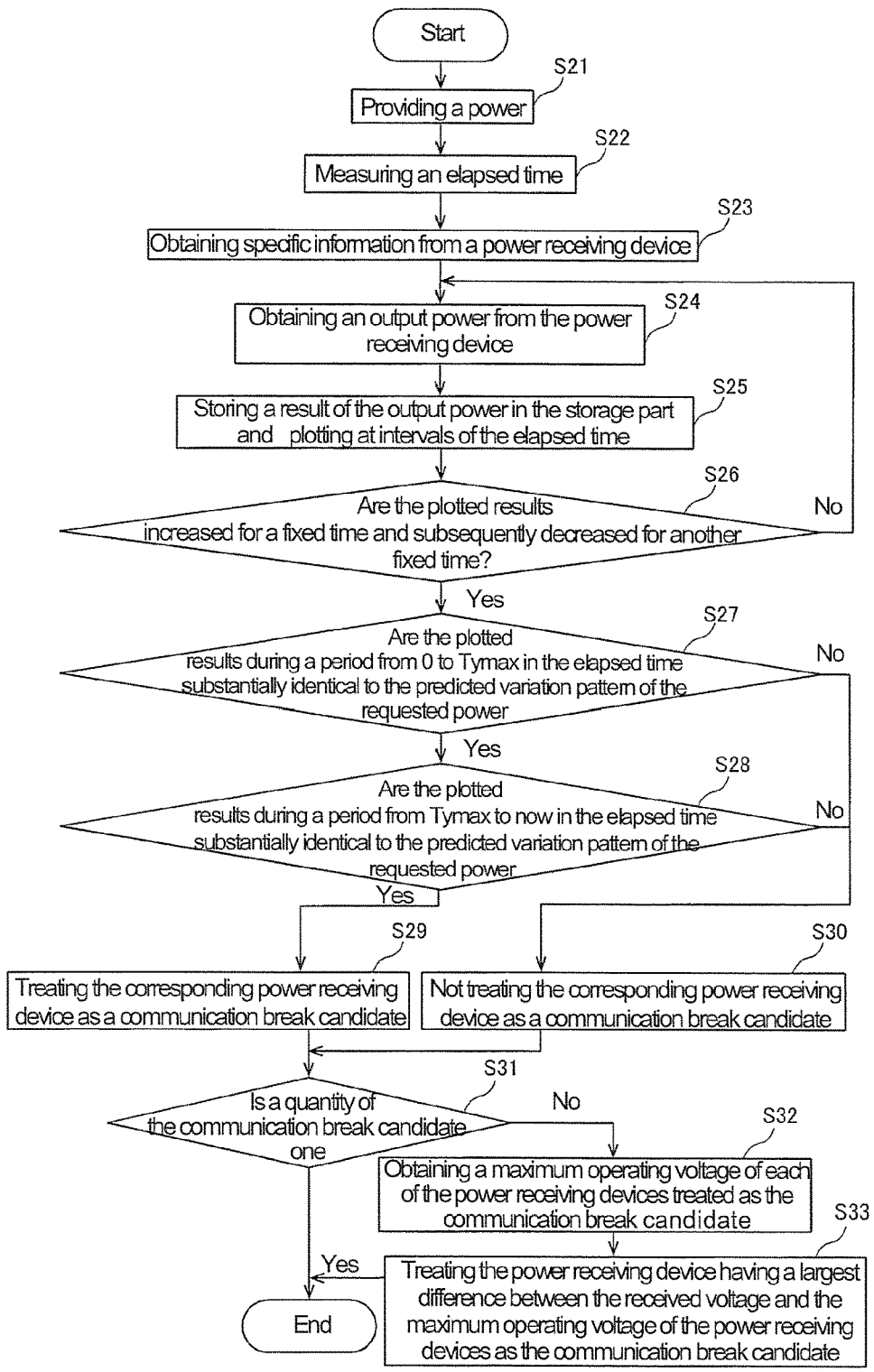
FIG. 5 is a flowchart illustrating a process in a selection of the power receiving device for breaking the communication according to the second embodiment of the invention.

As shown in FIG. 4, the power supply device 300 includes the power source 1, the power source controller 2, the communication target selection part 3, a storage part 41, a time measurement part 5, a determination part (controller) 61, a communication part 71, the power supply coil 8 and the power measurement part 9.

(Configuration of Each Part of the Power Supply Device)

The communication part 71 obtains specific information (e.g., addresses) from the power receiving devices 200. The power measurement part 9 measures the output power of the power source 1. The storage part 41 stores a measured variation pattern of the output power of the power source 1 in an elapsed time and a predicted variation pattern of the output power of the power source 1 in the elapsed time predicted in advance. The determination part 61 determines whether the measured variation pattern of the output power in the elapsed time is substantially identical to the predicted variation pattern of the output power in the elapsed time predicted in advance. In addition, the method for determining whether they are approximate or not may refer to the description in the first embodiment.

(Selection of the Power Receiving Device for Breaking the Communication)

Next, referring to FIG. 5, a selection of the power receiving device 200 for breaking the communication made by the power supply device 300 of the second embodiment is described as follows. As similar to the first embodiment, one of rules for determining whether to preferentially disconnect the communication or not is based on the reducing speed of the requested power of the power receiving device 200. For instance, among three communication break candidates, as shown by the equation (2a) of the second embodiment in FIG. 2, when the requested power [W] is reduced in relative to time variation, the power receiving device having the requested power [W] first reached within a fixed value on the time T may be preferentially disconnected. Here, as an example, the fixed value may be 1 W or 0 W. Said fixed value may also be appropriately adjusted according to characteristic or actual charging requirement of the power receiving device 200.

First of all, in step S21, a power is provided to the power supply coil 8 (referring to FIG. 4).

In step S22, an elapsed time counted from the time when starting to supply the power is measured.

In step S23, specific information (e.g., addresses) is obtained from the power receiving device 200.

In step S24, an output power of the power source 1 is measured.

In step S25, a result of the output power obtained in step S24 is stored in the storage part 41 and plotted at intervals of the elapsed time.

In step S26, whether the plotted results obtained in step S25 are increased for a fixed time and subsequently decreased for another fixed time is determined. If yes, the process proceeds to step S27, and otherwise returns to step S24.

In step S27, whether the plotted results (measured variation pattern) starting from 0 to Tymax (referring to FIG. 3) in the elapsed time are substantially identical to the predicted variation pattern of the output power stored in the storage part 41 is determined. If the result is substantially identical, the process proceeds to step S28, and otherwise proceeds to step S30.

In step S28, whether the plotted results after the time point Tymax in the elapsed time are substantially identical to the predicted variation pattern of the output power stored in the storage part 41 is determined. If the result is substantially identical, the process proceeds to step S29, and otherwise proceeds to step S30.

In step S29, the corresponding power receiving device 200 is treated as a communication break candidate.

In step S30, the corresponding power receiving device 200 is not treated as the communication break candidate.

In step S31, whether a quantity of the communication break candidate is one is determined. If the quantity of the communication break candidate is two or more, the process proceeds to step S32.

In step S32, a maximum operating voltage of each of the power receiving devices 200 treated as the communication break candidate is obtained.

In step S33, the power receiving device 200 having a largest difference between the maximum operating voltage obtained in step S32 and the received voltage among the power receiving devices 200 is treated as the communication break candidate.

In a modification example of step S32 to S33, in order to prevent an unchargeable issue of the power receiving device 200 caused by the received voltage being less than a minimum operating voltage, the minimum operating voltage of each of the power receiving devices 200 being the communication break candidate is obtained and the power receiving devices 200 having a largest difference between the minimum operating voltage and the received voltage of the power receiving device 200 is treated as a communication break candidate.

Effects of Second Embodiment

The following effects may be obtained according to the second embodiment.

In the second embodiment, as described above, the determination part 61 determines whether the measured variation pattern of the output power (output information) of the power source 1 in the elapsed time is approximate to the predicted variation pattern of the output power of the power source 1 in the elapsed time, and preferentially disconnect the power receiving device 200 determined as being approximate. Accordingly, the variation of the output power of the power source 1 becomes predictable in the elapsed time once the measured variation pattern of the output power of the power source 1 in the elapsed time is approximate to the predicted variation pattern of the output power of the power source 1 in the elapsed time. Therefore, by disconnecting the predictable power receiving device 200, the number of the power receiving devices 200 that the communication part 71 communicates with may be prevented from exceeding the predetermined number of the power receiving devices 200 that the communication part 71 is capable of communicating with, and the power may be properly supplied. Further, since the power receiving device 200 treated as the communication break candidate is directly determined by checking the output power of the power source 1, it is not required to obtain information such as the received power of the power receiving device 200 so the overall operation may be simplified.

Furthermore, in the second embodiment, as described above, the determination part 6 determines that the measured variation pattern is approximate to the predicted variation pattern when the measured variation pattern of the output power in the elapsed e is substantially identical to the predicted variation pattern of the output power continuously increased for the fixed time and subsequently decreased for the another fixed time. Accordingly, whether the power receiving device 200 is the power receiving device 200 having the battery that can be stably charged for more than the fixed time through the cccv control may be determined. Also, if the measured variation pattern is determined as being approximate to the predicted variation pattern, the variation of the output power of the power source 1 becomes predictable in the elapsed time. Therefore, the power may still be properly supplied even if the predictable power receiving device 200 is disconnected.

Moreover, the second embodiment can also provide other effects similar to those of the first embodiment.

Third Embodiment

Next, referring to FIG. 6 and FIG. 7, the configuration of a power supply device 400 according to the third embodiment of the invention is described as follows. Unlike the first embodiment, power receiving devices 500 not including the battery (e.g., a light emitting diode (LED) lighting) are provided in the third embodiment instead. A predicted variation pattern of a requested power of the power receiving device 500 in an elapsed time includes a variation pattern of the requested power showed no variation for more than a fixed time. Further, the components similar to those in the first embodiment are marked with the same reference numbers used in the first embodiment and related descriptions thereof are omitted hereinafter.

(Overall Configuration of the Power Supply Device)

Figure 6:
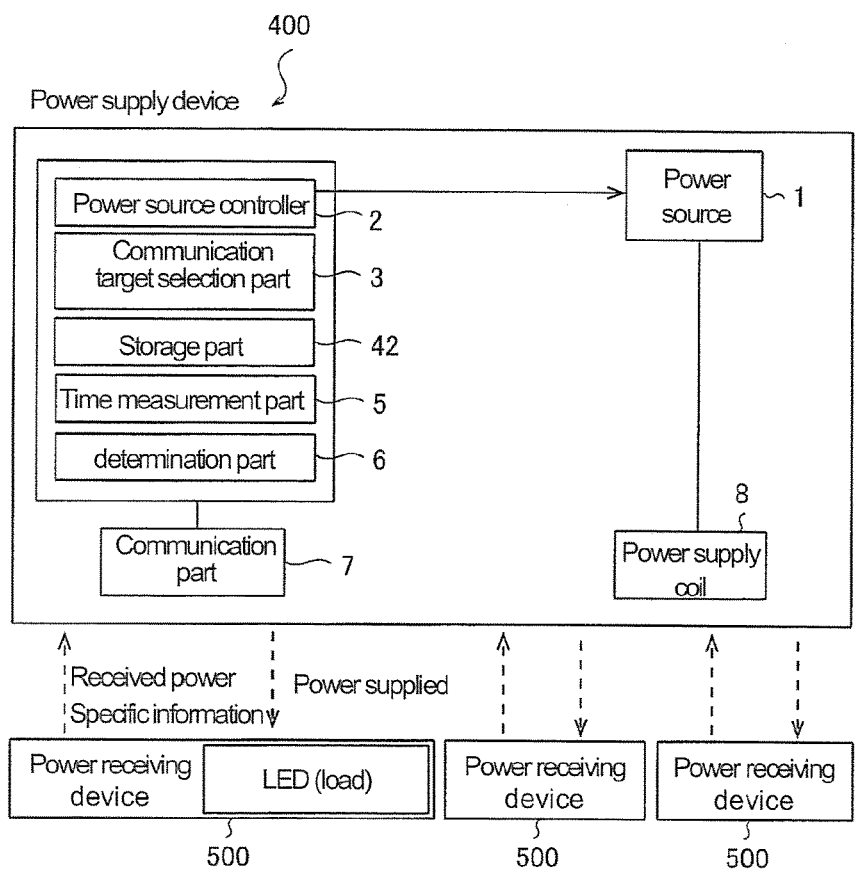
FIG. 6 is a block diagram illustrating overall configuration of the power supply device in the third embodiment of the invention.
Figure 7:
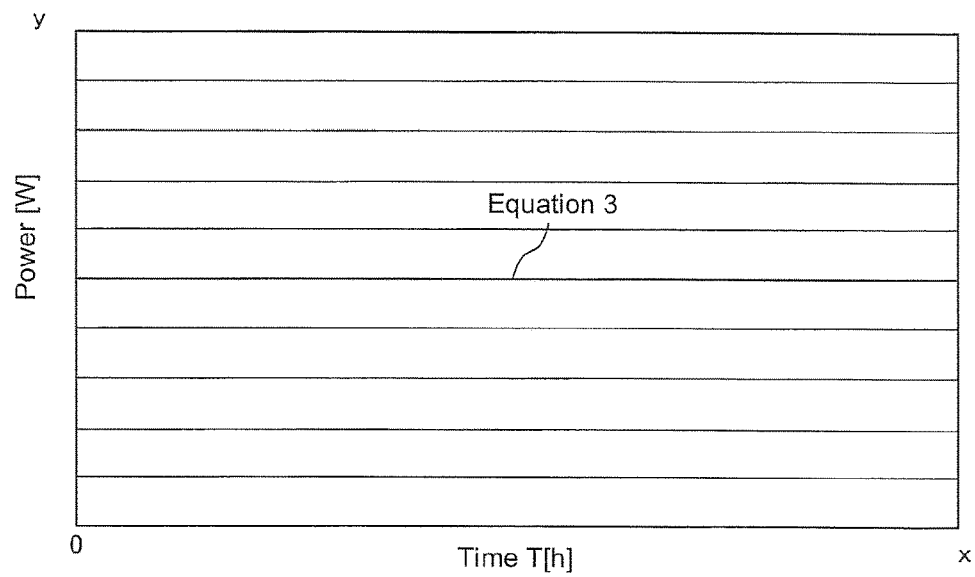
FIG. 7 is a graph illustrating a variation pattern of the requested power of the power receiving device over time in the third embodiment of the invention.

As shown in FIG. 6, the power supply device 400 includes the power source 1, the power source controller 2, the communication target selection part 3, a storage part 42, the time measurement part 5, the determination part (controller) 6, the communication part 7 and the power supply coil 8.

(Configuration of Each Part of the Power Supply Device)

In the storage part 42, a plurality of variation of the requested power in the elapsed time are stored as the predicted variation patterns. For example, an equation (3) as shown in FIG. 7 is stored in the storage part 42 as a variation pattern of the requested power showed no variation over a fixed time (e.g., 1 hour). Moreover, j is set as arbitrary constant (e.g., 1).

$$y=j \quad (3)$$

(Selection of the Power Receiving Device for Breaking the Communication)

Next, referring to FIG. 8, a selection of the power receiving device 500 for breaking the communication made by the power supply device 400 of the third embodiment is described as follows. In addition, the method for determining whether they are approximate or not may refer to the description in the first embodiment. When all the communication break candidates are the power receiving device 500 having the variation pattern showing no variation over time as described in the third embodiment, the power receiving device having a longer power-supply elapsed time is preferentially disconnected.

First of all, in step S41, a power is provided the power supply coil 8 (referring to FIG. 6).

In step S42, an elapsed time counted from the time when starting to supply the power is measured.

In step S43, specific information (e.g., addresses) is obtained from the power receiving device 500.

In step S44, a received power is obtained from the power receiving device 500.

In step S45, a result of the received power obtained in step S44 is stored in the storage part 42 and plotted at intervals of the elapsed time.

In step S46, whether it is elapsed for more than a fixed time is determined. If yes, the process proceeds to step S47, and otherwise returns to step S44.

In step S47, whether the plotted results obtained in step S45 are substantially identical to the predicted variation pattern of the requested power stored in the storage part 42 is determined. If the result is substantially identical, the process proceeds to step S48, and otherwise proceeds to step S49.

In step S48, the corresponding power receiving device 500 is treated as a communication break candidate.

In step S49, the corresponding power receiving device 500 is not treated as the communication break candidate.

In step S50, whether a quantity of the communication break candidate is one is determined. If the quantity of the communication break candidate is two or more, the process proceeds to step S51.

In step S51, a maximum operating voltage of each of the power receiving devices 500 treated as the communication break candidate is obtained.

In step S52, the power receiving device 500 having a largest difference between the maximum operating voltage obtained in step S51 and the received voltage among the power receiving devices 500 is treated as the communication break candidate.

In a modification example of step S51 to S55, in order to prevent an unchargeable issue of the power receiving device 500 caused by the received voltage being less than a minimum operating voltage, the minimum operating voltage of each of the power receiving devices 500 being the communication break candidate is obtained and the power receiving devices 500 having a largest difference between the minimum operating voltage and the received voltage of the power receiving device 500 is treated as a communication break candidate.

Effects of Third Embodiment

The following effects may be obtained according to the third embodiment.

In the third embodiment, as described above, the determination part 6 determines that the measured variation pattern is approximate to the predicted variation pattern when the measured variation pattern of the received power in the elapsed time is substantially identical to the predicted variation pattern of the request power showing no variation for more than the fixed time. Accordingly, whether the power receiving device 500 is the power receiving device 500 not having the battery may be determined. Also, if the measured variation pattern is determined to be approximate to the predicted variation pattern, the received power of the power receiving device 500 is predictable to show no variation in the elapsed time. Therefore, the power may still be stably supplied even if the predictable power receiving device 500 is disconnected.

Moreover, the third embodiment can also provide other effects similar to those of the first embodiment.

Fourth Embodiment

Next, referring to FIG. 1, FIG. 8 and FIG. 9, the configuration of a power supply device 101 according to the fourth embodiment of the invention is described as follows. Unlike the first embodiment, in the fourth embodiment, a predicted variation pattern of a requested power of the power receiving device 201 in an elapsed time includes a variation pattern of the requested power continuously decreased for more than a fixed time. Further, the components similar to those in the first embodiment are marked with the same reference numbers used in the first embodiment and related descriptions thereof are omitted hereinafter.

(Overall Configuration of the Power Supply Device)

As shown in FIG. 1, the power supply device 101 includes the power source 1, the power source controller 2, the communication target selection part 3, a storage part 43, the time measurement part 5, the determination part (controller) 6, the communication part 7 and the power supply coil 8.

(Configuration of Each Part of the Power Supply Device)

In the storage part 43, a plurality of variation patterns such as the variation pattern of the requested power in the elapsed time are stored as the predicted variation pattern. For example, an equation (4) and an equation (5) as shown in FIG. 9 are stored in the storage part 43 as a variation pattern of the requested power continuously decreased for more than the fixed time (e.g., 1 hour). Moreover, k, l, m and n are set as arbitrary constant (e.g., 1).

$$y = -k \times x + 1 \quad (4)$$

$$y = \frac{m}{x^n} \quad (5)$$

(Selection of the Power Receiving Device for Breaking the Communication)

Figure 8:
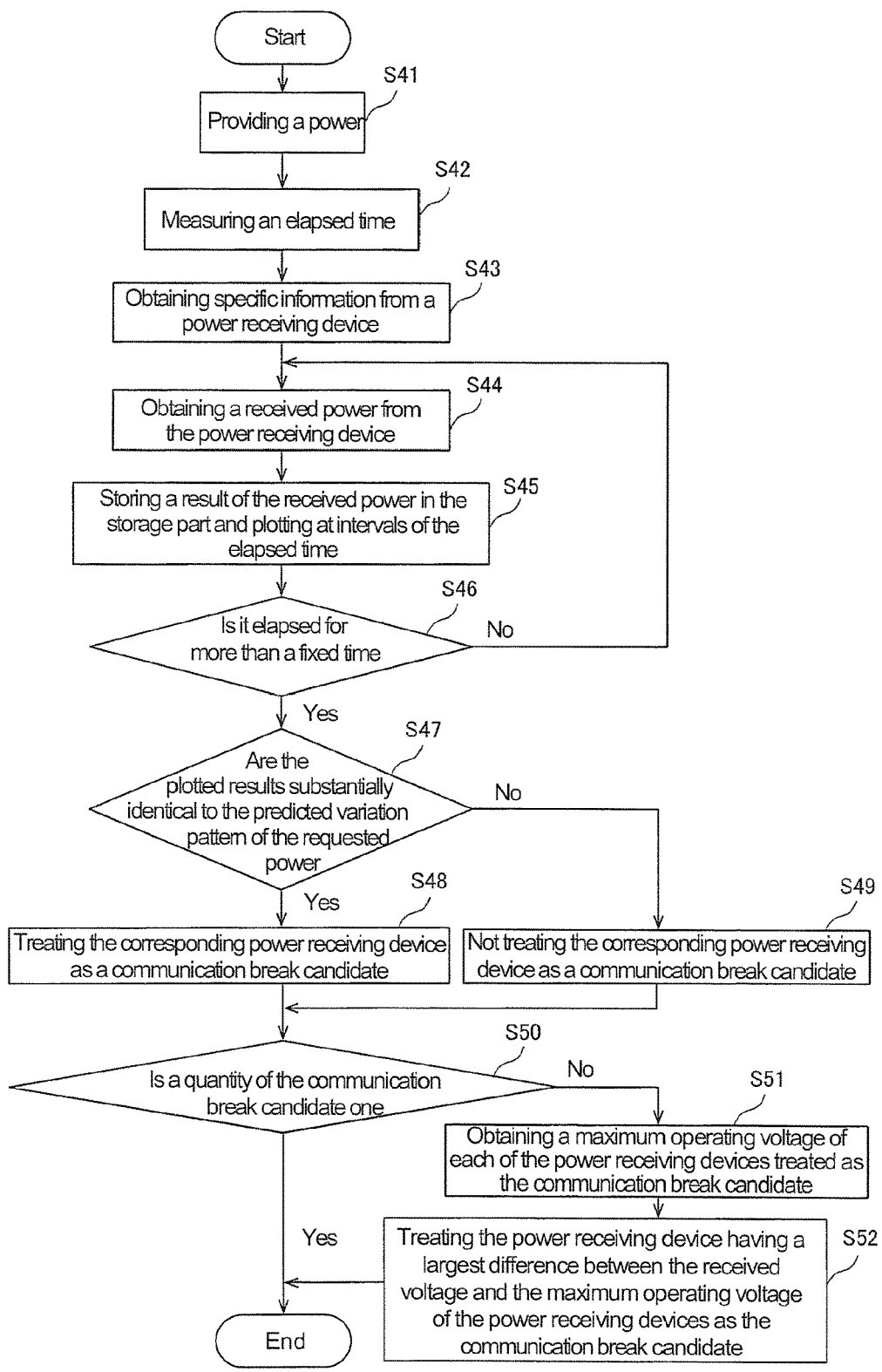
FIG. 8 is flowchart illustrating a process in a selection of the power receiving device for breaking the communication according to the third embodiment and the fourth embodiment of the invention.
Figure 9:
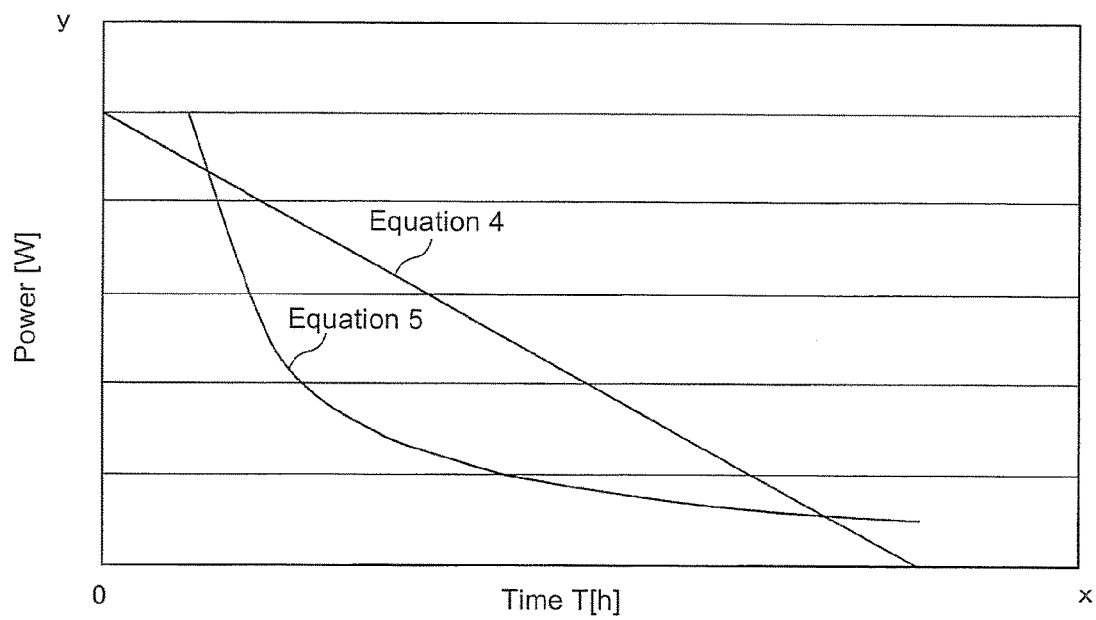
FIG. 9 is a graph illustrating a variation pattern of the requested power of the power receiving device over time in the fourth embodiment of the invention.

The selection of the power receiving device 201 for breaking the communication performed by the power supply device 101 is identical to the selection described in the third embodiment shown in FIG. 8. As similar to the first and second embodiments, one of rules for determining whether to preferentially disconnect or not is based on the reducing speed of the requested power of the power receiving device 201. For instance, among three communication break candidates, as shown by the equation (5) of the second embodiment in FIG. 9, when the requested power [W] is reduced in relative to time variation, the power receiving device having the requested power [W] first reached within a fixed value on the time T may be preferentially disconnected. Here, as an example, the fixed value may be 1 W or 0 W. Said fixed value may also be appropriately adjusted according to characteristic or actual charging requirement of the power receiving device 201.

Effects of Fourth Embodiment

The following effects may be obtained according to the fourth embodiment.

In the fourth embodiment, as described above, the determination part 6 determines that the measured variation pattern is approximate to the predicted variation pattern when the measured variation pattern of the received power in the elapsed time is substantially identical to the predicted variation pattern of the received power continuously decreased for more than the fixed time. Accordingly, if the measured variation patter is determined to be approximate to the predicted variation pattern, the variation of the received power of the power receiving device 201 becomes predictable in the elapsed time. Therefore, the power may still be properly supplied even if the predictable power receiving device 201 is disconnected. Further, it may be determined that the power supply is no longer required after the requested power becomes zero so the power supply may be prevented from wasting.

Moreover, the fourth embodiment can also provide other effects similar to those of the first embodiment.

Fifth Embodiment

Figure 10:
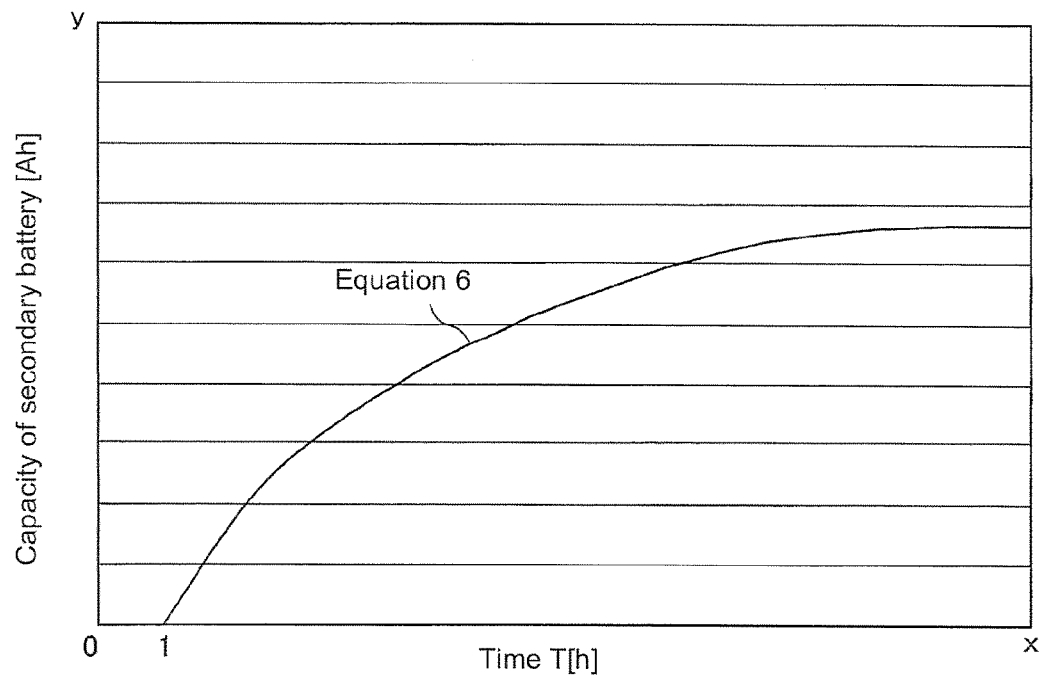
FIG. 10 is a graph illustrating a variation pattern of a remaining capacity of a secondary battery of the power receiving device over time in the firth embodiment of the invention.
Figure 11:
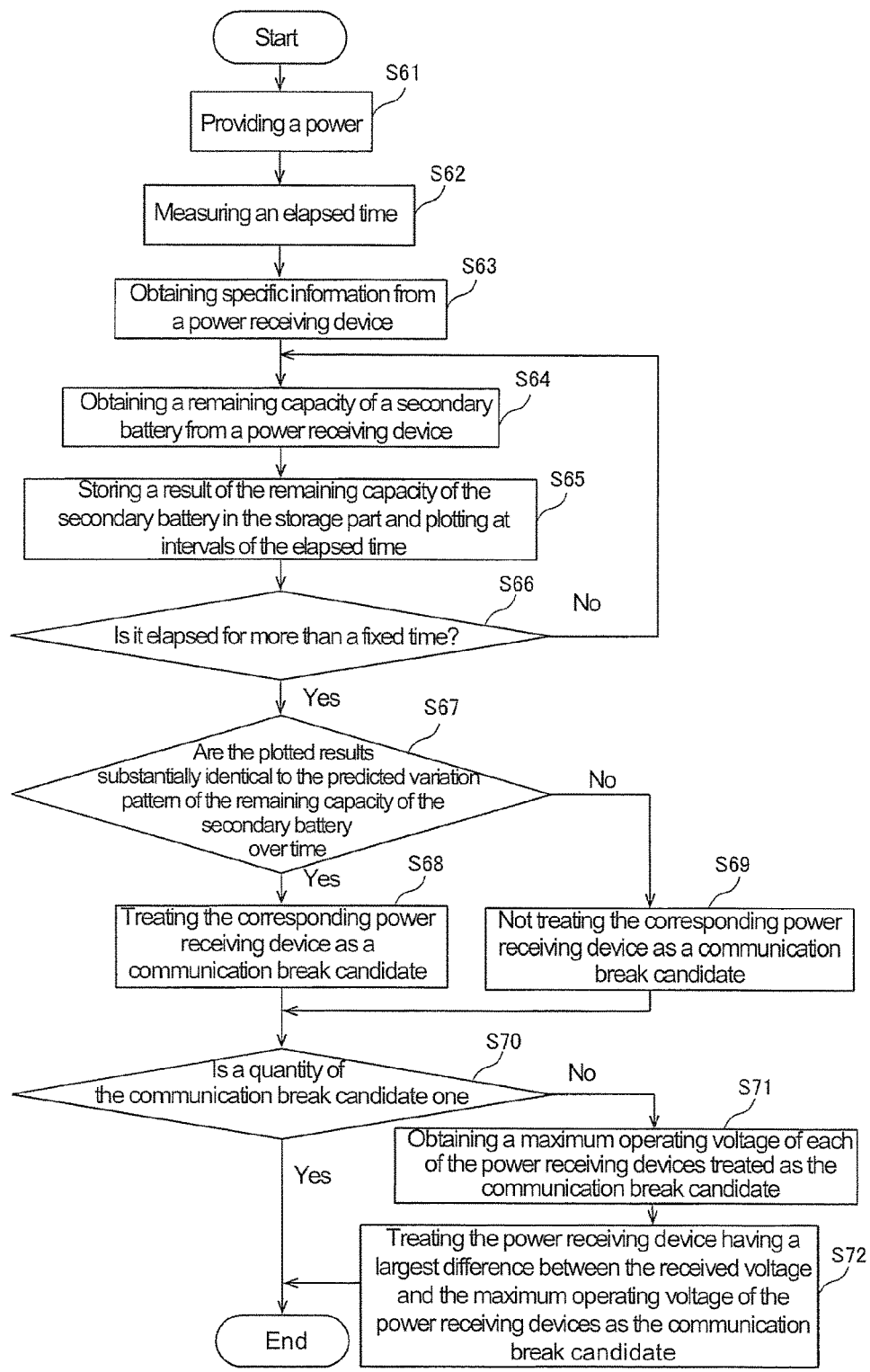
FIG. 11 is a flowchart illustrating a process in a selection of the power receiving device for breaking the communication according to the fifth embodiment of the invention.

Next, referring to FIG. 1, FIG. 10 and FIG. 11, the configuration of a power supply device 102 according to the fifth embodiment of the invention is described as follows. Unlike the first embodiment, in the fifth embodiment, a determination part 62 determines whether a measured variation pattern of a remaining capacity of a secondary battery of a power receiving device 202 in an elapsed time is approximate to a predicted variation pattern of the remaining capacity of the secondary battery in the elapsed time. Further, the components similar to those in the first embodiment are marked with the same reference numbers used in the first embodiment and related descriptions thereof are omitted hereinafter.

(Overall Configuration of the Power Supply Device)

As shown in FIG. 1, the power supply device 102 includes the power source 1, the power source controller 2, the communication target selection part 3, a storage part 44, the time measurement part 5, the determination part (controller) 62, the communication part 7 and the power supply coil 8.

(Configuration of Each Part of the Power Supply Device)

In the storage part 44, a plurality of variation patterns such as the variation patterns of the remaining capacity of the secondary battery in the elapsed time are stored as the predicted variation patterns. For example, an equation (6) as shown in FIG. 10 is stored in the storage part 44 as a variation pattern of the secondary battery saturated after a fixed time (e.g., 1 hour). The determination part 62 determines whether the measured variation pattern of the remaining capacity of the secondary battery of the power receiving device 202 in the elapsed time is substantially identical to the predicted variation pattern of the remaining capacity of the secondary battery of the power receiving device 202 in the elapsed time. Moreover, o and p are set as arbitrary constant (e.g., 1).

$$y = o \times \log_p x \quad (6)$$

(Selection of the Power Receiving Device for Breaking the Communication)

Next, referring to FIG. 11, a selection of the power receiving device 202 for breaking the communication made by the power supply device 102 of the fifth embodiment is described as follows. In addition, the method for determining whether they are approximate or not may refer to the description in the first embodiment.

In the fifth embodiment, the communication break candidates are determined according to the remaining capacity of the secondary battery of the power receiving device 202. In another embodiment, when all the power receiving devices 202 treated as the communication break candidates have the measured variation pattern satisfying the predicted variation pattern of equation (6), the power receiving device 102 can receive a maximum capacity [Ah] of the secondary battery of the power receiving device 202 from the power receiving device 202 being the communication break candidate. In this case, the power receiving device having a smallest difference between the maximum capacity and a current capacity of the power receiving device may also be preferentially disconnected.

In yet another embodiment, the power supplying device 102 receives a charging condition (progress information) of the secondary battery of the power receiving device 202 from the power receiving device 202. In this case, the power supplying device 102 can preferentially disconnect the power receiving device 202 approaching a fully-charged state (100%) according to charging progress information obtained from the power receiving device 202.

First of all, in step S61, a power is provided to the power supply coil 8 (referring to FIG. 1).

In step S62, an elapsed time counted from the time when starting to supply the power is measured.

In step S63, specific information (e.g., addresses) is obtained from the power receiving device 202.

In step S64, a remaining capacity of a secondary battery is obtained from the power receiving device 202.

In step S65, a result of the remaining capacity of the secondary battery obtained in step S64 is stored in the storage part 44 (referring to FIG. 1) and plotted at intervals of the elapsed time.

In step S66, whether it is elapsed for more than a fixed time is determined. If yes, the process proceeds to step S67, and otherwise returns to step S64.

In step S67, whether the plotted results (measured variation pattern) obtained in step S65 are substantially identical to the predicted variation pattern of the remaining capacity of the secondary battery stored in the storage part 44 is determined. If the result is substantially identical, the process proceeds to step S68, and otherwise proceeds to step S69.

In step S68, the corresponding power receiving device 202 is treated as a communication break candidate.

In step S69, the corresponding power receiving device 202 is not treated as the communication break candidate.

In step S70, whether a quantity of the communication break candidate is one is determined. If the quantity of the communication break candidate is two or more, the process proceeds to step S71.

In step S71, a maximum operating voltage of each of the power receiving devices 202 treated as the communication break candidate is obtained.

In step S72, the power receiving device 202 having a largest difference between the maximum operating voltage obtained in step S71 and the received voltage among the power receiving devices 202 is treated as the communication break candidate.

In a modification example of step S71 to S72, in order to prevent an unchargeable issue of the power receiving device 202 caused by the received voltage being less than the minimum operating voltage, the minimum operating voltage of each of the power receiving devices 202 being the communication break candidate is obtained and the power receiving device 202 having a largest difference between the minimum operation voltage and the received voltage of the power receiving devices 202 treated as a communication break candidate.

Effects of Fifth Embodiment

The following effects may be obtained according to the fifth embodiment.

In the fifth embodiment, as described above, the determination part 62 determines that the measured variation pattern is approximate to the predicted variation pattern when the measured variation of the remaining capacity of the secondary battery in the elapsed time is substantially identical to the predicted variation pattern of the remaining capacity of the secondary battery saturated after the fixed time. Accordingly, if the measured variation pattern is determined to be approximate to the predicted variation pattern, the variation of the remaining capacity of the secondary battery of the power receiving device 202 becomes predictable in the elapsed time. Therefore, the power may still be properly supplied even if the predictable power receiving device 202 is disconnected. Further, since the power receiving device 202 treated as the communication break candidate is directly determined by checking the remaining capacity of the secondary battery of the power receiving device 202, the power may be supplied more accurately. Further, it may be determined that the power supply is no longer required after the remaining capacity of the secondary battery is saturated so the power supply may be prevented from wasting.

Moreover, the fifth embodiment can also provide other effects similar to those of the first embodiment.

Modification Examples

It should be noted that, the embodiments in the disclosure are regarded as examples rather than limitations in all aspects. The scope of the invention is defined by appended claims instead of the descriptions in the embodiments, and includes any possible changes (modification examples) containing equivalent meanings in appended claims within the scope.

For example, in the first embodiment, the second embodiment, the fourth embodiment and the fifth embodiment, the smart phone is used as the power receiving device, but the invention is not limited thereto. For instance, a personal computer (PC), a tablet computer, a digital camera and the like may also be used as the power receiving device.

Further, in the first embodiment, the third embodiment and the fourth embodiment, the received power is obtained from the power receiving device, but the invention is not limited thereto. For instance, a received voltage may also be obtained from the power receiving device.

Further, in the second embodiment, the output power is obtained from the power source, but the invention is not limited thereto. For instance, an output voltage may also be obtained from the power source.

Further, in the first embodiment to the fifth embodiment, a quantity of the power supply coil installed in the power supply device is one, but the invention is not limited thereto. The quantity of the power supply coil may also be more than one.

Further, in the first embodiment o the fifth embodiment, the measured variation pattern is determined to be approximate to the predicted variation pattern according to the absolute value of the plotted results, but the invention is not limited thereto. For instance, the measured variation pattern may be determined as being approximate to the predicted variation pattern according to a waveform shape of the plotted results.

Further, in the first embodiment to the fifth embodiment, the predetermined number of the power receiving devices that the communication part is capable of communicating with is three, but the invention is not limited thereto. For instance, the predetermined number may also be four or more.

Further, in the first embodiment to the fifth embodiment, the fixed time for observing the variations of the power and the remaining capacity of the secondary battery is 1 hour or 0.5 hour, but the invention is not limited thereto. For instance, the fixed time may also be a time other than 1 hour or 0.5 hour.

Further, in the first embodiment to the fifth embodiment, the coefficients (i.e., a to p) of the equations for predicting the variation pattern are 1, but the invention is not limited thereto. The coefficients may also be a constant other than 1.

Further, in the first embodiment to the fifth embodiment, the power receiving device having the largest difference between the maximum operating voltage and the received voltage is treated as the communication break candidate when the quantity of the communication break candidate is two or more, but the invention is not limited thereto. In this invention, in order to prevent the phenomenon in which the power receiving device 200 is uncharged due to the received voltage being lower than a minimum operating voltage, the power receiving device having a largest difference between the minimum operating voltage and the received voltage may also be treated as the communication break candidate.

The first embodiment to the fifth embodiment are all described by using the example in which the variation patterns of the received power of the power receiving devices in the elapsed time are of the same type. The invention is also adapted to the case where all the variation patterns described in the first embodiment to the fifth embodiment coexist in the measured variation patterns of the communication break candidates being receiving power in the elapsed time. In such case, the received power showing no variation over time is selected to be preferentially disconnected. For instance, if the communication break candidates include the power receiving device having the variation pattern relative to time variation as in the first, second, fourth and fifth embodiments as well as the power receiving device having the variation pattern showing no variation over time as in the third embodiment, the power receiving device having the variation pattern showing no variation as in the third embodiment is preferentially disconnected.

Further, in the first embodiment to the fifth embodiment, for convenience of explanation, operations of the controller in the invention are performing by using the flowchart of a flow driven type which performs the operations in sequence, but the invention is not limited thereto. In this invention, the operations of the controller may also be performing by using an event driven type process which performs a corresponding operation each time when a specific event occurs. Nonetheless, the operations may be performed by completely using the event driven type process as well as using a combination of both the event driven type process and the flow driven type process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply device, comprising:
   a power supply part, capable of supplying a power to a plurality of external devices;
   a communication part, capable of communicating with the external devices; and
   a controller, disconnecting communication with one or more of the external devices based on a comparison of a power supplied information and predicted values of the power supplied information of the external devices in a case that a number of requests for a communication from the external devices exceeds a number that the communication part is capable of communicating with at the same time.

2. The power supplying device according to claim 1, wherein
   the power supplied information comprise a plurality of plotted results, and
   the controller decides to disconnect one or more of the external devices when a fixed ratio or more of the plotted results fall within a fixed range of the predicted values of the power supplied information.

3. The power supplying device according to claim 1, wherein
   the communication part obtains power reception information from the external devices being communicated with,
   the power supplied information comprises the power reception information of the external devices.

4. The power supplying device according to claim 3, wherein
   the power reception information comprises a received power of the external devices,
   and the predicted values comprises a variation pattern of a requested power of the external devices in an elapsed time.

5. The power supplying device according to claim 1, wherein
   the predicted values comprises a variation pattern continuously increased for a fixed time and subsequently decreased for another fixed time.

6. The power supplying device according to claim 1, wherein
   the predicted values comprises a variation pattern showing no variation for more than a fixed time.

7. The power supplying device according to claim 1, wherein
   the predicted values comprises a variation pattern continuously decreased for more than a fixed time.

8. The power supplying device according to claim 3, wherein
   the power reception information comprises a remaining capacity of a secondary battery of the external devices,
   and the predicted values comprises a variation pattern of the remaining capacity of the secondary battery saturated after a fixed time.

9. The power supplying device according to claim 1, comprising: a power source,
   wherein the power supplied information comprises output information of the power source.

10. The power supplying device according to claim 9, wherein
    the output information of the power source comprises an output power of the power source.

11. The power supplying device according to claim 10, wherein
    the predicted values comprises a variation pattern of the output power continuously increased for a fixed time and subsequently decreased for another fixed time.

12. The power supplying device according to claim 1, wherein
    the controller disconnects one or more of the external devices having a largest difference between a minimum operating voltage and a received voltage of the external devices.

13. The power supplying device according to claim 4, wherein the controller disconnects one or more of the external devices whose requested power first reached a fixed value among the external devices.

14. The power supplying device according to claim 4, wherein
the controller disconnects one or more of the external devices having a longer power supplied elapsed time among the external devices.

15. The power supplying device according to claim 4, wherein
the controller disconnects one or more of the external devices corresponding to the predicted values showing no variation for more than a fixed tune among the external devices.

16. The power supplying device according to claim 1, wherein
the controller disconnects one or more of the external devices having a smallest difference between a maximum capacity and a current capacity of a secondary battery of the external devices among the external devices.

17. The power supplying device according to claim 1, wherein
the controller disconnects one or more of the external devices approaching a fully-charged state according to a charging condition of a secondary battery of the external devices.

* * * * *